(No Model.)

J. W. CALLARD.
WATER FILTER.

No. 360,850. Patented Apr. 12, 1887.

Attest:
W. A. Bartlett
F. Brawner

Inventor:
John W. Callard
by C. B. Brock
his Atty

UNITED STATES PATENT OFFICE.

JOHN W. CALLARD, OF TOLEDO, OHIO.

WATER-FILTER.

SPECIFICATION forming part of Letters Patent No. 360,850, dated April 12, 1887.

Application filed June 24, 1886. Serial No. 206,081. (No model.)

*To all whom it may concern:*

Be it known that I, JOHN W. CALLARD, a citizen of the United States, residing at Toledo, in the county of Lucas and State of Ohio, have invented certain new and useful Improvements in Water-Filters; and I do hereby declare the following to be a full, clear, and exact description of the invention, such as will enable others skilled in the art to which it appertains to make and use the same.

My invention relates to filters.

The object of my present improvement is to provide a filter of the class known to the trade as "The Stevens Filter," which shall be simpler and cheaper in its construction, adapted especially as a filter of a cheaper grade, and yet possessing all the merits of a good filter.

With the above object in view the invention consists in the following construction and arrangement, which will be fully described, and the points believed to be new set forth in the claim.

Figure 1:
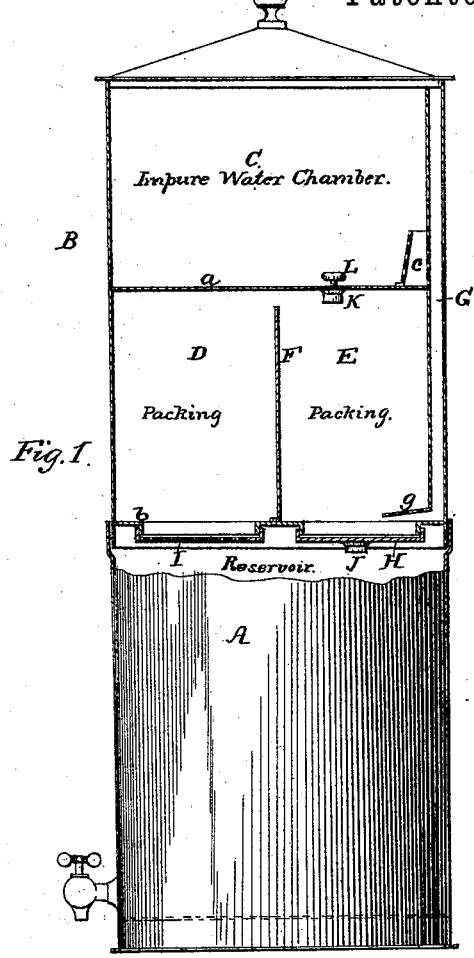
Figure 2:
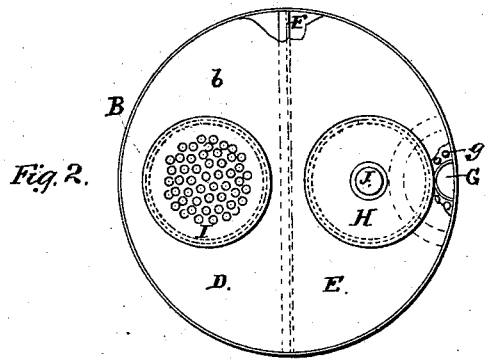

Figure 1 represents a partial side elevation and central vertical section of a filter to which I have applied my improvements. Fig. 2 is a bottom view of the upper section, B, of the filter.

The filter comprises, preferably, two sections, A and B, which are easily separable. Section A is a vessel of ordinary cylindrical shape, provided with a faucet, and is the filtered or pure water reservoir. Section B fits into or on top of section A, and contains the impure-water chamber, the filtering-chamber, and the pipe-connections. Section B is surmounted by a cover.

C is the impure-water chamber. $a$ is a horizontal partition which forms the bottom of chamber C and separates it from the filtering-chamber D E.

G is a pipe of the cross-section shown in Fig. 2. It extends upward to the top of the filter for air-ventilation. It is perforated at $c$ for the discharge of the chamber C, at which point also is a perforated curved wall or guard, between which and the opening into pipe G a sponge or other straining material is placed. The bottom of pipe G, where it discharges into the chamber D E, is provided also with a perforated guard or wall, $g$, primarily to keep the packing from clogging the pipe.

Chamber D E is divided into two compartments by a partition, F, both of which contain the filtering media. Compartment D is charged or packed through the perforated screw-cap I and compartment E through the cap H. Partition F does not extend up to partition $a$, but a space is left at the top of the partition, over which the filtered water passes. Cap H is water-tight and cap I is perforated.

J is a screw-cap in cap H, and I is a cap in partition $a$, having a thumb-screw, L, so that it may be accessible through chamber C. These caps are for the purpose of cleansing the filter.

The impure water is received at the bottom of compartment E and discharged at the top thereof, and, vice versa, in compartment D, where it is finally discharged through perforated cap I into the pure-water reservoir A.

The caps I and H in the bottom of chamber D E serve the purpose of easily packing and repacking the filter.

Having described my invention, what I claim as new is—

In a filter, a casing comprising two separable parts, the lower part constituting the filtered-fluid chamber and the upper part having an upper impure-fluid chamber, and a lower packing-chamber provided with a diametrically-arranged vertical partition therein extending to near the top of said packing-chamber, a perforate cap at the bottom of the packing-chamber at one side of said partition, an imperforate cap at the bottom on the other side of the partition, and a pipe connecting the impure-chamber with the packing-chamber at the bottom of the latter, whereby the water is led down to the bottom of the packing-chamber and up over said partition and down through the packing-chamber again, all in combination, as set forth.

In testimony whereof I affix my signature in presence of two witnesses.

JOHN W. CALLARD.

Witnesses:
 GEORGE KIRK,
 RICHARD TRUMBULL.